United States Patent
Ahmed et al.

(10) Patent No.: US 12,196,562 B2
(45) Date of Patent: Jan. 14, 2025

(54) METHOD AND VEHICLE MANAGER FOR MANAGING REMOTE-CONTROLLED VEHICLE

(71) Applicant: Telefonaktiebolaget LM Ericsson (publ), Stockholm (SE)

(72) Inventors: Jawwad Ahmed, Kista (SE); Andreas Johnsson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 717 days.

(21) Appl. No.: 15/734,953

(22) PCT Filed: Jun. 5, 2019

(86) PCT No.: PCT/EP2019/064666
§ 371 (c)(1),
(2) Date: Dec. 3, 2020

(87) PCT Pub. No.: WO2019/234103
PCT Pub. Date: Dec. 12, 2019

(65) Prior Publication Data
US 2021/0231447 A1    Jul. 29, 2021

Related U.S. Application Data

(60) Provisional application No. 62/681,885, filed on Jun. 7, 2018.

(51) Int. Cl.
*G01C 21/34* (2006.01)
*G05D 1/00* (2024.01)
(Continued)

(52) U.S. Cl.
CPC ..... *G01C 21/3453* (2013.01); *G01C 21/3446* (2013.01); *G05D 1/0088* (2013.01);
(Continued)

(58) Field of Classification Search
None
See application file for complete search history.

(56) References Cited

U.S. PATENT DOCUMENTS 6,377,875 B1    4/2002   Schwaerzler
11,240,122 B2*  2/2022   Kolar ............... H04L 41/0895
(Continued)

OTHER PUBLICATIONS

Rerngvit Yanggratoke et al., "Predicting Real-Time Service-level Metrics from Device Statistics", IFIP/IEEE International Symposium on integrated Network Management, IM 2015, Ottawa, Canada, Dec. 22, 2014 (9 pages) (Year: 2014).*
(Continued)

*Primary Examiner* — Aniss Chad
*Assistant Examiner* — Mahmoud M Kazimi
(74) *Attorney, Agent, or Firm* — Rothwell, Figg, Ernst & Manbeck, P.C.

(57) ABSTRACT

A method performed by a vehicle manager (150) for managing a remote-controlled vehicle (160). The vehicle manager (150) obtains an original route to the destination passing a sequence of radio access points in a wireless network that a wireless device in the vehicle (160) will connect to in a communication with the vehicle manager (150) when the vehicle (160) travels along the original route. The vehicle manager (150) detects at least one deficient radio access point of the original route. The vehicle manager (150) then instructs the vehicle (160) to adapt its behaviour based on said detecting.

24 Claims, 6 Drawing Sheets

(51) Int. Cl.
*G06N 20/00* (2019.01)
*H04W 28/24* (2009.01)

(52) U.S. Cl.
CPC .......... *G05D 1/0276* (2013.01); *G06N 20/00* (2019.01); *H04W 28/24* (2013.01)

(56) References Cited

U.S. PATENT DOCUMENTS

| | | | |
|---|---|---|---|
| 11,777,854 B2* | 10/2023 | Vasseur | H04L 47/28 370/235 |
| 2015/0197010 A1* | 7/2015 | Ruuspakka | B25J 9/1664 700/245 |
| 2016/0371985 A1 | 12/2016 | Kotecha | |
| 2017/0160742 A1* | 6/2017 | Ross | H04W 72/51 |
| 2017/0277186 A1 | 9/2017 | Ross et al. | |
| 2018/0017973 A1* | 1/2018 | Teague | H04W 4/44 |

OTHER PUBLICATIONS

International Search Report and Written Opinion issued in International Application No. PCT/EP2019/064666 dated Aug. 21, 2019 (12 pages).

Rerngvit Yanggratoke et al., "Predicting Real-time Service-level Metrics from Device Statistics", IFIP/IEEE International Symposium on Integrated Network Management, IM 2015, Ottawa, Canada, Dec. 22, 2014 (9 pages).

Jawwad Ahmed et al., "Predicting SLA Violations in Real Time using Online Machine Learning", arXiv:1509.01386, Sep. 2015 (available at https://arxiv.org/abs/1509.01386) (8 pages).

Teuvo Kohonen, Senior Member, IEEE, Proceedings of the IEEE, vol. 78, No. 9, Sep. 1990 (17 pages).

Daniel J. Dean et al., "UBL: Unsupervised Behavior Learning for Predicting Performance Anomalies in Virtualized Cloud Systems," ICAC '12: Proceedings of the 9th international conference on Autonomic computing. Sep. 2012 pp. 191-200 (https://doi.org/10.1145/2371536.2371572) (10 pages).

Teuvo Kohonen, Senior Member, IEEE, "The Self-Organizing Map", Proceedings of the IEEE, vol. 78, No. 9, Sep. 1990 (17 pages).

* cited by examiner

METHOD AND VEHICLE MANAGER FOR MANAGING REMOTE-CONTROLLED VEHICLE

CROSS REFERENCE TO RELATED APPLICATION(S)

This application is a 35 U.S.C. § 371 National Stage of International Patent Application No PCT/EP2019/064666, filed Jun. 5, 2019, designating the United States and claiming priority to U.S. provisional patent application No. 62/681,885, filed on Jun. 7, 2018. The above identified applications are incorporated by this reference.

TECHNICAL FIELD

The present disclosure relates generally to a method and a vehicle manager for managing a remote-controlled vehicle.

BACKGROUND

Remote control of vehicles is an emerging business where focus has been related to control of vehicles, e.g. in environments that may be difficult or dangerous for humans to enter, such as mines or for fire and/or rescue operations. A remote-controlled vehicle may be controlled for driving the vehicle along a path or road, and/or for performing any other functions such as measuring or observing the environment or executing operations on any item outside the vehicle.

To enable such remote control, the vehicle is typically equipped with a wireless device which may communicate with some kind of a vehicle manager over radio access points of a wireless network. Thereby, the vehicle manager is able to remotely control the vehicle through the wireless network when the vehicle travels towards a destination.

In the field of telecommunication, it is often of interest for network operators to ensure that communication services are executed with adequate performance and quality. Depending on the type of service and requirements in a service agreement or the like, a certain level of quality may be required or expected, which is sometimes regulated by a Service Level Agreement (SLA) or the like. Consequently, to fulfil SLAs and meet user expectations the network operator needs to gain control of the performance of a service when executed, and be able to obtain predictions of the performance in the future during service execution. For example, service performance and resulting quality are typically related to network latency, visual and/or audio reproduction and data accuracy, as experienced by an end-user. In particular, remote control of vehicles has typically high demands on the communication service performance of the wireless network and the radio access points therein, which is often regulated by SLAs related to requirements of said communication.

SUMMARY

It is an object of embodiments described herein to address at least some of the problems and issues discussed herein. It is possible to achieve this object and others by using a method and a vehicle manager as defined in the attached independent claims.

According to a first aspect of embodiments herein, the object is achieved by a method performed by a vehicle manager for managing a remote-controlled vehicle. The vehicle manager obtains an original route for the remote-controlled vehicle wherein said original route passes a sequence of radio access points in a wireless network that a wireless device in the vehicle will connect to in a communication with the vehicle manager when the vehicle travels along the original route. The vehicle manager detects at least one deficient radio access point of the original route that will provide a connection not fulfilling requirements of said communication. The vehicle manager then, in response to the detecting, instructs the vehicle to adapt its behaviour based on said detecting.

According to another aspect of embodiments herein, the object is achieved by a vehicle manager configured to manage a remote-controlled vehicle. The vehicle manager is configured to obtain an original route for the remote-controlled vehicle wherein said original route passes a sequence of radio access points in a wireless network that a wireless device in the vehicle will connect to in a communication with the vehicle manager when the vehicle travels along the original route. The vehicle manager is further configured to detect at least one deficient radio access point of the original route that will provide a connection not fulfilling requirements of said communication. The vehicle manager is also configured to, in response to the detecting, instruct the vehicle to adapt its behaviour based on said detecting.

The above method and vehicle manager may be configured and implemented according to different optional embodiments to accomplish further features and benefits, to be described below.

A computer program is also provided comprising instructions which, when executed on at least one processor in the above vehicle manager, cause the at least one processor to carry out the method described above. A carrier is also provided which contains the above computer program, wherein the carrier is one of an electronic signal, an optical signal, a radio signal, or a computer readable storage medium.

An original route, for a remote-controlled vehicle, that passes a sequence of radio access points in a wireless network that a wireless device in the vehicle will connect to in a communication with a vehicle manager is obtained. And with the realisation that by detecting at least one deficient radio access point of the original route, the vehicle manager instructs the vehicle to adapt its behaviour based on said detecting. Thereby improved availability, reliability and safety of the remote-controlled vehicle are achieved so that certain requirements of said communication are more likely to be fulfilled.

BRIEF DESCRIPTION OF DRAWINGS

The solution will now be described in more detail by means of exemplary embodiments and with reference to the accompanying drawings, in which.

DETAILED DESCRIPTION

The wireless network discussed herein may be any type of network such as an LTE network, a 5G network or a Wi-Fi network, without limitation to these examples.

For example, many projects are developing use cases and techniques for remote-control of heavy machinery, such as an LTE-based remote-controlled wheel loader, and remote operations over communication networks of drill rigs.

Remote-controlled vehicles may also take other shapes or forms, such as drones, ships, airplanes, vessels or cars. It is thus assumed herein that these vehicles may be controlled over a wireless medium, such as a wireless communication network. The remote-controlled vehicle may also be an Automated Guided Vehicle (AGV).

As mentioned above, remote-controlled travelling of vehicles, such as e.g. cars, trucks, loaders and flying vehicles, e.g. drones, should take the physical environment and surroundings into account to make informed control decisions. However, if the remote-controlled vehicle is controlled over a shared wireless network, such as a 4G or 5G radio network, the performance of the radio access points, e.g. radio base stations (RBS), network elements, such as routers and links, and cloud execution environment and its impact on remote-controlled vehicle service-level agreements (SLAs) should be considered. If the wireless network cannot fulfil the SLA the remote-controlled vehicle may fail to operate.

SLA violation may depict issues with many possible aspects of a remote driving service including but not limited to performance problems on the control channel, e.g. from the driver to the vehicle, video streaming channel(s) quality, delay problems from the vehicle to the driver, or overall lag, i.e. time difference, between when the driver executes an action remotely to the time it is actuated by the vehicle and finally when the update is reflected on the driver screen. Long lag times may make the remote-control challenging.

As mentioned above, remote-controlled vehicles require high-performance communication over the wireless network. There are at present no techniques for detecting and forecasting deficiencies and the performance of the control between a vehicle manager and a vehicle, based on planned and executed routes of the vehicle and network statistics.

Figure 1A:
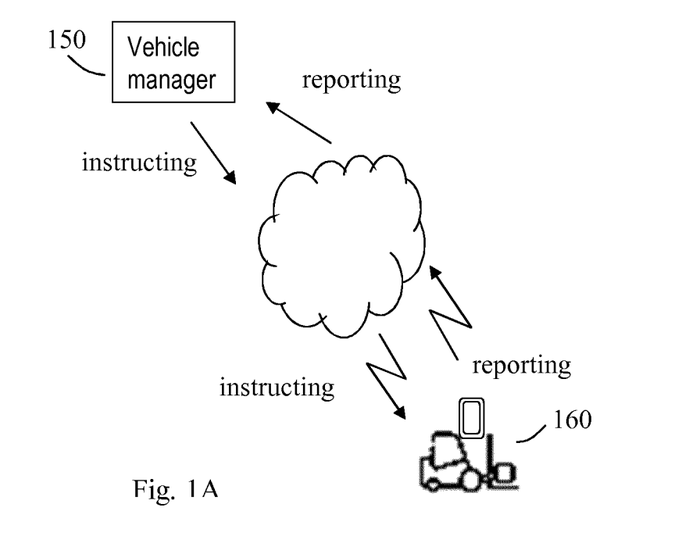
FIG. 1A is a communication overview illustrating a vehicle manager communicating with a wireless device in a remote-controlled vehicle over a wireless network.

The solution will now be described and explained in terms of functionality in a vehicle manager 150 which is operable to manage a remote-controlled vehicle 160. FIG. 1A illustrates a communication overview where a vehicle manager 150 communicates with a wireless device in a remote-controlled vehicle 160 over a wireless network.

Figure 1B:
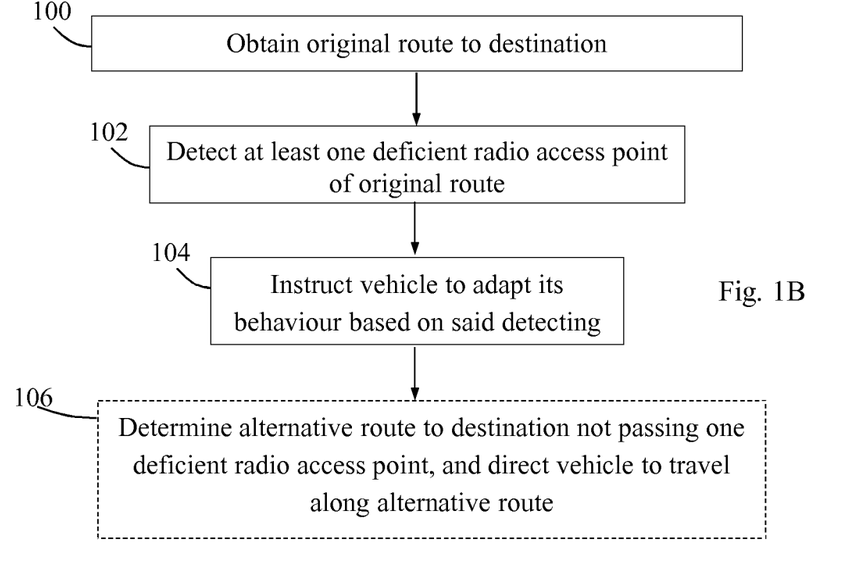
FIG. 1B is a flowchart depicting embodiments of a procedure in a vehicle manager.

An example of how the solution may be employed in terms of actions performed by a vehicle manager such as the vehicle manager 150 shown in FIG. 1A is illustrated by the flow chart in FIG. 1B. FIG. 1B thus illustrates a procedure in the vehicle manager 150 for managing a remote-controlled vehicle 160. Some optional example embodiments that could be used in this procedure will also be described.

A first action 100 illustrates that the vehicle manager 150 obtains an original route for the remote-controlled vehicle 160 wherein said original route passes a sequence of radio access points in a wireless network that a wireless device in the vehicle 160 will connect to in a communication with the vehicle manager 150 when the vehicle 160 travels along the original route. The vehicle 160 may e.g. be a car, drone, airplane, ship or vessel. A destination that the vehicle 160 travels towards may be at any position, e.g. even the same position that the vehicle 160 starts from. The destination may further be defined as two or more intermediate positions that the vehicle 160 is required to pass. The vehicle 160 may be autonomous but the vehicle manager 150 may obtain a route such that the vehicle 160 may be managed, monitored and/or surveilled along the route.

In another action 102, the vehicle manager 150 detects at least one deficient radio access point of the original route that will provide a connection not fulfilling requirements of said communication. This action 102 may be performed in more detail according to the following example embodiments.

In some embodiments, the at least one deficient radio access point of the original route may be detected, based on performance history of said radio access points.

In some further embodiments, the at least one deficient radio access point of the original route may be detected using a machine-learning model that is trained based on the performance history.

In some further embodiments, the detecting may comprise determining a forecast of when the at least one deficient radio access point will not fulfil said requirements of the communication.

In some further embodiments, the detecting may comprise determining that the at least one deficient radio access point violates an SLA, since a predicted performance indicator of the communication of said deficient radio access point(s) does not fulfil a threshold condition.

In some further embodiments, the determining that the at least one deficient radio access point violates a SLA may be based on a shortest path algorithm.

In some further embodiments, the performance history may comprise one or more of: radio access point metrics, performance metrics related to the communication between driver and remote-controlled vehicle 160, network metrics and parameters related to a cloud edge infrastructure. The performance history may be collected over a time interval. These metrics described above may e.g. be performance indicators such as radio signal strength indicators (RSSIs), delay between the remote-controlled vehicle 160 and the vehicle manager 150, CPU or memory used in the base station or in the vehicle 160, CPU or memory used in any other node supporting the communication, e.g. in the cloud, network utilization, and Quality of Experience (QoE) of the communication.

In order to avoid that said requirements of the communication are not fulfilled, it is realised in this solution that the vehicle 160 may take another route which does not pass any such deficient radio access point.

In another action 104, the vehicle manager 150, in response to the detecting, instructs the vehicle 160 to adapt its behaviour based on said detecting.

Instructing the vehicle 160 to adapt its behaviour based on this knowledge means basically that the vehicle is instructed to perform or operate in a manner so that it avoids passing and connecting to any deficient access point which would otherwise degrade or even interrupt the communication with the vehicle manager 150. This can be avoided by any of the following alternatives of adapting the vehicle's behaviour.

In some embodiments, adapting the vehicle's behaviour comprises at least one of: wait, return vehicle to home, park at a nearby place, revert to autonomous mode, run with limited speed and send diagnostics data to the vehicle manager 150.

In another action 106, the vehicle manager 150 may in some embodiments determine an alternative route to the destination not passing the at least one deficient radio access point, and wherein the instructing comprises directing the vehicle 160 to travel along said alternative route. This action 106 may be performed in more detail according to the following example embodiments.

In some embodiments, the alternative route to the destination may be determined based on performance history of said radio access points.

In some further embodiments, the alternative route to the destination may be determined using a machine-learning model that is trained based on the performance history.

However, in some cases it may not be possible to find a useful alternative route that does not pass any deficient radio access point not fulfilling said communication requirements. For example, there may be a great traffic load on the network so that a substantial number of its radio access points are currently not able to fulfil the communication requirements, or any alternative route(s) where the communication requirements are fulfilled may be too long so that the vehicle 160 will not arrive at the destination in time, and so forth. If no useful alternative route can be found, the following action is performed instead.

Thanks to the above operations of the procedure in FIG. 1B, it is an advantage that non-fulfilment of the requirements of said communication can be avoided so that the availability, reliability and safety are improved of the remote-controlled vehicle 160. The above procedure may be particularly advantageous to employ in areas with insufficient or "spotty" radio coverage and/or interference or even in cases of service breakdowns or high load conditions.

A further advantage is that real-time updates of the performance indicators experienced by the vehicle 160 may be based on the network infrastructure conditions using machine learning.

It is also an advantage of using machine learning based decisions for predicting the deficiency time as well enhancing accuracy based on radio access points and relevant network infrastructure along the route that the vehicle 160 travels along.

Real-time service assurance may become an integral part in transforming any general and flexible network and cloud infrastructures into a robust and highly available one that can ensure low latency and agreed service quality to its customers. A service assurance system for telecom services may be able to detect and localize the deficiencies that may violate the agreed service quality. This is a complex task already in legacy systems and will become even more challenging when executing services with high requirements, such as remote-controlled vehicles. Particularly important is that a service assurance system may diagnose the detected deficiency.

One potential approach to service assurance is based on machine learning, where the service quality and behaviour may be learned from observations of the system, i.e. the performance history. The ambition is to perform real-time predictions of the service quality and in case of service quality degradation or SLA violations perform root cause analysis or cause inference so that mitigation actions may be taken to remedy the detected faults and restore the violated service as soon as possible to minimize the impact of potential penalties from SLA violations.

It was mentioned above that a deficient radio access point of the original route may be detected using a machine-learning model that is trained based on the performance history, and that the alternative route to the destination may be likewise determined using a machine-learning model that is trained based on the performance history. Some examples of machine learning techniques that may be employed in the above detecting and determining will now be discussed.

Machine learning has been used in the past to build prediction models for service quality assurance. For example, R. Yanggratoke, J. Ahmed, J. Ardelius, C. Flinta, A. Johnsson, D. Gillblad, and R. Stadler, "Predicting real-time service-level metrics from device statistics," in Integrated Network Management (IM), 2015 IFIP/IEEE International Symposium on. IEEE, 2015, describes predicting user application quality-of-service (QoS) parameters from the performance history. And Jawwad Ahmed, Andreas Johnsson, Rerngvit Yanggratoke, John Ardelius, Christofer Flinta, Rolf Stadler, "Predicting SLA Violations in Real Time using Online Machine Learning." arXiv preprint arXiv:1509.01386 (2015), discloses prediction of SLA violations using machine learning based on the performance history. The key idea is to use sample data for training a statistical model that may generalize well, which is then used for predictions of unseen data.

Machine learning refers to the task of predicting unseen samples based on the currently available examples using statistical learning techniques. Predictions may broadly be categorized into a classification problem or regression problem. Machine learning methods may in general also be categorized as either supervised or unsupervised. For supervised learning the labeled input data is accompanied with expected output while unsupervised learning takes unlabeled data as input. Many classical statistical and machine learning methods fall into supervised learning methodology.

Logistic regression is a common method for solving classification problems. It specifies the log-odds posterior probability for the classes and takes positive or negative real numbers as input, while output values are either zero or one. It may hence be interpreted as the posterior probability of drawing a sample from the respective class. The coefficients of the model may efficiently be trained using Stochastic Gradient Decent (SGD) which makes it suitable for online applications. An example of an online version is the Gradient Ascent Logistic Regression.

Another family of classifiers is decision trees, where the feature space is split into a set of regions based on one or more homogeneity criteria recursively until there is no more significant gain in terms of homogeneity of the members of each class. The benefit of decision trees over linear methods is that they perform well even when the inherent relationship between the predictors and the response variable is non-linear. And non-parametric property means that no assumptions are made on the form or shape of the true underlying function. The cost of making a decision is dependent on the height of the tree which is logarithmic in the size of the tree.

Decision trees are flexible and have low bias but may lead to high variance in predictions in many cases. However, studies have shown that their effectiveness can be significantly increased when used as a base component for the ensembles such as bagging or random forest.

Figure 2:
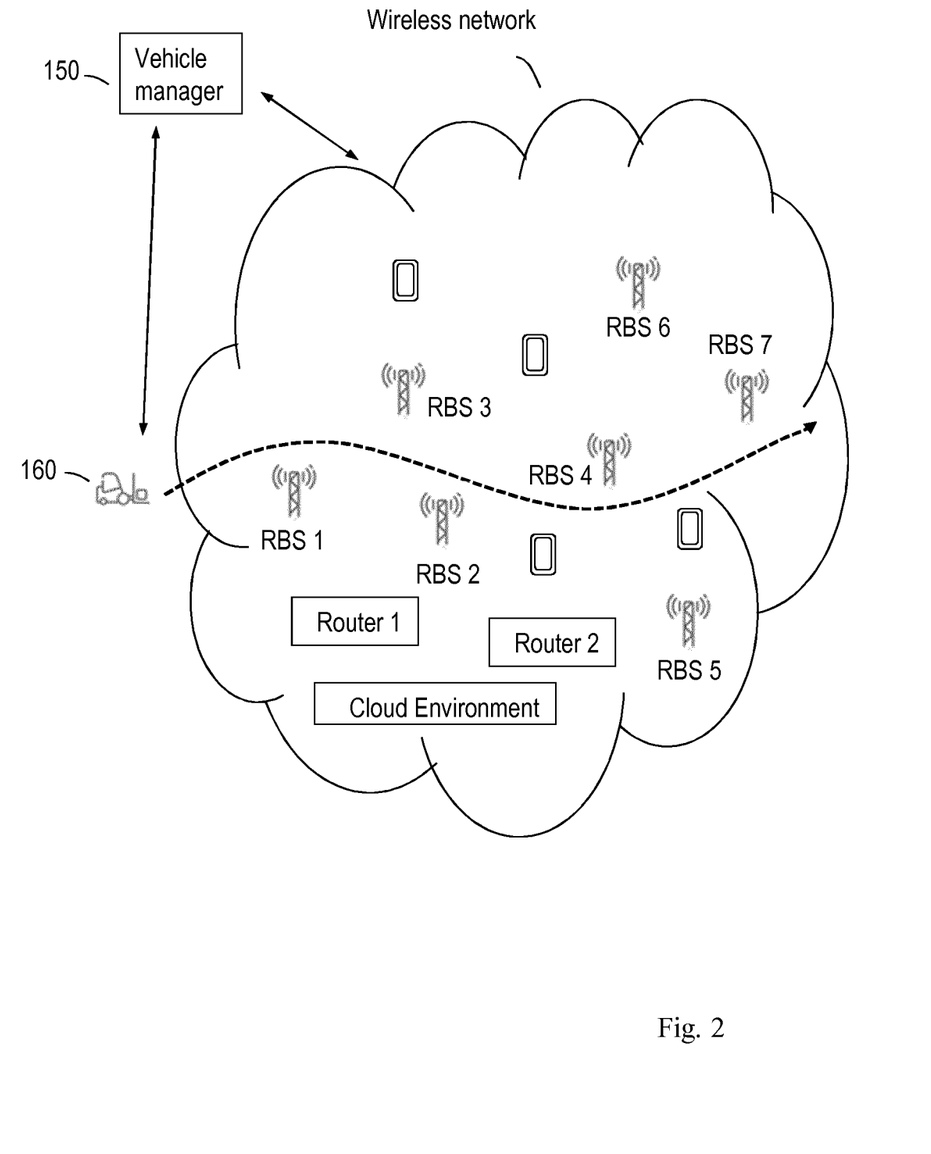
FIG. 2 is a communication overview illustrating an original route for a remote-controlled vehicle, according to some example embodiments.

FIG. 2 illustrates schematically the original route of the remote-controlled vehicle 160, and the infrastructure in terms of radio base stations RBS 1-RBS 8, routers, and cloud execution environment. RBS 1-RBS 8 are examples of the above-mentioned radio access points which can provide a connection fulfilling the requirements of said communication or not, which may be further dependent on the performance of any routers and cloud execution environment they are using.

Figure 3:
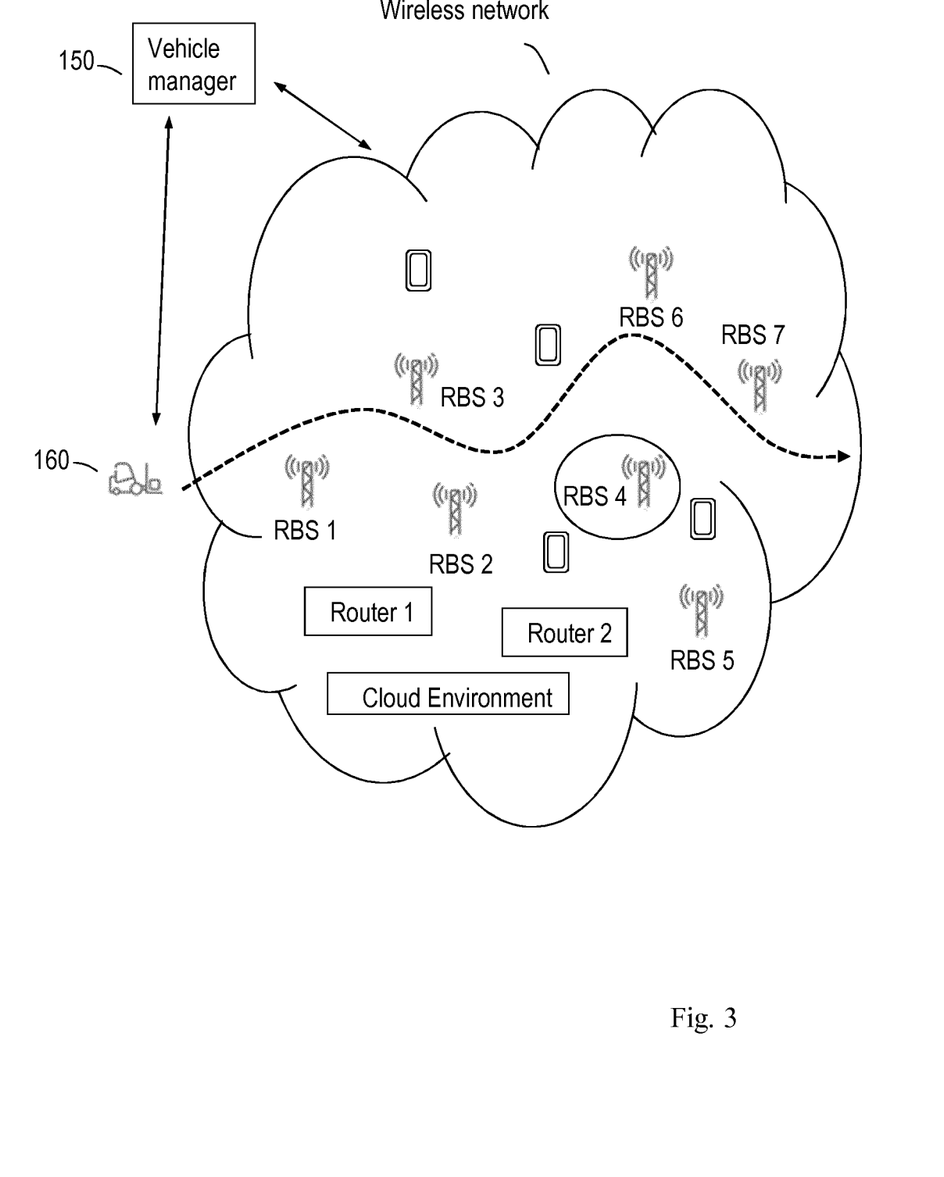
FIG. 3 is a communication overview illustrating an alternative route for a remote-controlled vehicle, according to some example embodiments.

FIG. 3 illustrates schematically the alternative route of the vehicle 160, under the assumption that at least one radio access point of the original route is deficient, such as RBS 4 in FIG. 3.

A key performance indicator (KPI) prediction model, which may be only one or a set of models $M_i$, is an example that may be used to detect at least one deficient radio access point of the original route and determine an alternative route to the destination not passing the at least one deficient radio access point. Service performance KPIs Y such as latency, loss, or jitter, may be predicted from infrastructure statistics X measured at one or more radio access point, network and/or cloud. Y may also include service specific, e.g. video streaming, KPIs as well such as video and audio bitrate and frame-rate. Both X and Y may evolve over time, influenced, e.g. by the load on the network, radio conditions, resource utilization in the cloud and mobility.

The evolution of the metrics X and Y may be modelled as time series $X_t$ and $Y_t$. By using the framework of machine learning, a model $M_i$ may be trained to predict Y from X for a given t. A model $M_i$ may be trained for each radio access point RBS 1-RBS 8 in the area with specialized learning for its coverage area. In principle all models $M_i$ may be identical if they e.g. consider GPS positions. Training model $M_i$ requires observations of Y and features X obtained from each entity of the infrastructure supporting the service. Examples of X features are given below:
- Features related to the radio access point may include Receiver Signal Strength Indicator (RSSI), Link Quality Indicator (LQI), number of connected devices, GPS location and throughput.
- Network features may include various counters and network queue statistics but also performance-related metrics such as packet loss, round-trip time, corrupted packets, and throughput.
- Cloud and Data Centre (DC) metrics may include CPU and memory utilization of the infrastructure where the service execute, but also other metrics such as cache misses that reflects isolation problems between virtual machines or containers.

As mentioned above, the model $M_i$ may be one example of predicting and also forecasting KPIs for critical services, e.g. part of the SLA for the remote-controlled vehicle 160, based on an estimated or planned vehicle routes and the model $M_i$.

Figure 4:
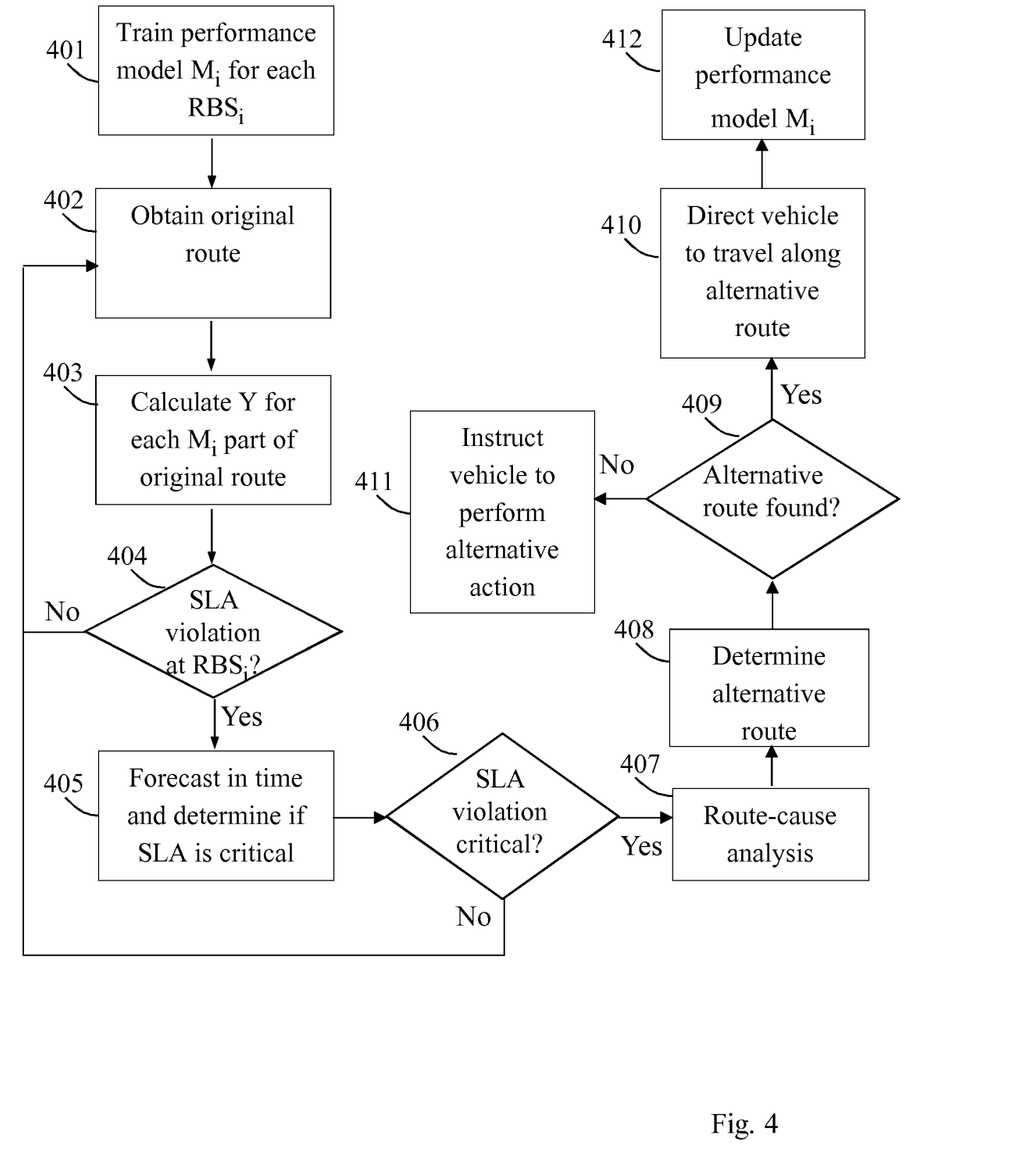
FIG. 4 is a flow chart illustrating an example of a more detailed procedure in a vehicle manager, according to further example embodiments.

Another example of a more detailed procedure according to further example embodiments will now be described with reference to the flow chart in FIG. 4, likewise with further reference to FIG. 1A and FIG. 1B. In this example, the following actions are performed by the vehicle manager 150:

Action 401—The performance model $M_i$ may be trained based on samples of X and Y, where each model $M_i$ may be associated with a geographical position corresponding to the radio access point RBS 1-RBS 8. In some embodiments all models may be identical.

Action 402—The vehicle manager 150 obtains the original route of the remote-controlled vehicle 160. The original route may be provided by the vehicle manager 150 via planning tools, i.e. tools that determine a route based on input values, or based on machine learning where the original route is estimated based on previous routes for the specific vehicle and task.

The original route may include a list of radio access point identities (IDs), corresponding to a subset of models $M_i$. The original route may be based on the destination, or the mission, of the remote-controlled vehicle 160.

The original route may also include an estimated time of arrival for each radio access point ID based on e.g. its velocity.

This action corresponds to the above-described action 100.

Action 403—Service performance KPIs Y, such as latency, loss, or jitter for each model $M_i$ part of the original route, are then calculated.

Action 404—Model $M_i$ predicts if there will be an SLA violation at a radio access point, i.e. if at least one radio access point of the original route is deficient in the sense of not fulfilling the communication requirements. If no radio access point of the original route is deficient then the procedure returns to action 402.

Action 405—If at least one radio access point of the original route is deficient, a forecast in time of when this violation will take place, using the original route, may be determined, i.e. a forecast of when the at least one deficient radio access point will not fulfil the requirements of the communication may be determined.

Action 406—It may be determined if the SLA violation is critical, e.g. if Y is above or below a threshold, i.e. it may be determined that the at least one deficient radio access point violates the SLA, since a predicted performance indicator of said deficient radio access point does not fulfil a threshold condition. If the SLA violation is determined not to be critical, then the procedure returns to action 402.

Action 407—If the SLA violation is determined to be critical then:
- A root-cause analysis and/or fault localization may be performed based on $M_i$ to determine whether:
  - There is a performance bottleneck in the environment close to the at least one deficient radio access point that violates the SLA.
  - There is a performance bottleneck in the network, e.g. router.
  - There is a performance bottleneck in the cloud execution environment.

This action corresponds to the above-described action 102.

An alternative route, in action 408, may be determined that traverses a set of radio access points where the service is expected to fulfil the SLA, i.e. determining an alternative route to the destination not passing the at least one deficient radio access point, e.g. avoiding radio access point bottlenecks, network bottlenecks and/or cloud execution bottlenecks. The alternative route may be determined based on a shortest path algorithm. For example, if the radio access points, e.g. RBSs, and also other network elements such as routers, are modelled as a graph with edges and vertices, then Dijkstra's shortest path algorithm may be deployed, with very high weights on the links connecting to the identified base stations. This action corresponds to the above-described action 106.

Action 409—If an alternative route to the destination not passing the at least one deficient radio access point was determined then, in action 410, the vehicle manager 150 directs the vehicle 160 to travel along the alternative route. This action corresponds to the above action 106.

Action 411—The vehicle manager 150 instructs the vehicle 160 to perform an alternative action if said alternative route cannot be determined. The alternative action may be any one out of: wait, return vehicle to home, park at a nearby place, revert to autonomous mode and run with limited speed. Action 411 corresponds to the above action 104.

Action 412—Performance model $M_i$ may be updated periodically based on feedback from the vehicle 160 and infrastructure, i.e., X and Y. The update of the performance model $M_i$ may be performed using state-of-the-art online learning or transfer learning mechanisms. The alternative route may be computed automatically or by the vehicle manager 150 based on the output from the prediction model $M_i$, to avoid the deficient RBSs or the RBSs that are going to be deficient in the rest of the route when the vehicle 160 will be in range.

Figure 5:
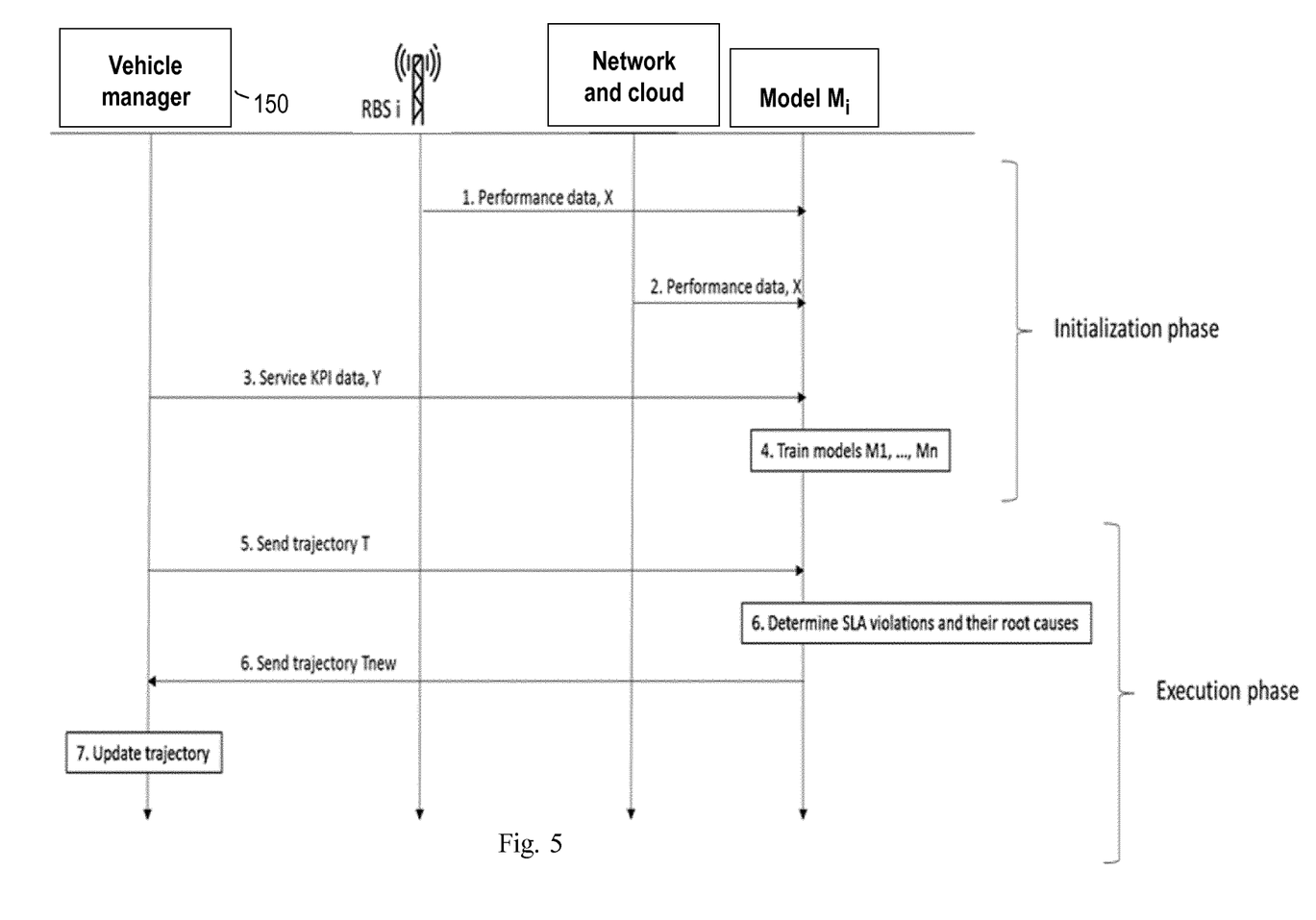
FIG. 5 is a signalling scheme according to further example embodiments.

FIG. 5 shows an example procedure of how signalling between the entities may be executed. The main entities are the vehicle manager 150, a set of RBSs, the network and cloud infrastructure, and a computing platform or computers for machine learning models $M_1 \ldots M_n$, e.g. machine learning model $M_i$.

First the performance data X is sent from $RBS_j$ and the network and cloud infrastructure to the modelling entity $M_i$, steps 1 and 2. To train the model $M_i$ as $M:X \rightarrow Y$, a set of performance KPIs Y observed by the vehicle manager 150 is transmitted to the model $M_i$, in step 3.

The model $M_i$ may be trained in step 4.

When the remote-controlled vehicle 160 is in action and makes use of the model $M_i$ the following steps may be taken:

In step 5 the planned trajectory T, i.e. the original route, is transmitted from the remote-controlled vehicle 160 to the model $M_i$, e.g. to a modelling computer.

In step 6 the model $M_i$ may determine whether there will be SLA violations if the original route is executed.

In this example, there is an SLA violation, and the model $M_i$ signals an alternative route $T_{new}$.

In step 7 the vehicle manager 150 updates its route.

Steps 1-4 may be an initialization phase and steps 5-7 may be an execution phase of the procedure.

Figure 6:
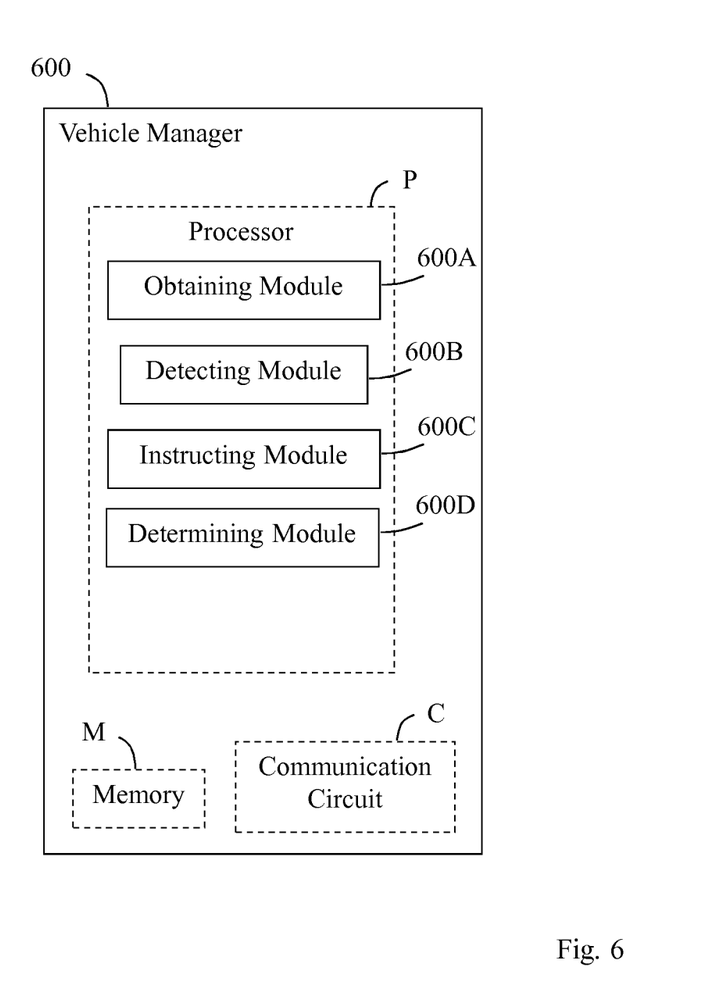
FIG. 6 is a block diagram illustrating how a vehicle manager may be structured, according to further example embodiments.

The block diagram in FIG. 6 illustrates a detailed but non-limiting example of how a vehicle manager 600 may be structured to bring about the above-described solution and embodiments thereof. The vehicle manager 600 corresponds to vehicle manager 150 in FIGS. 1A, 1B, 2, 3, 4 and 5 respectively.

In this FIG. 6, the vehicle manager 600 may be configured to operate according to any of the examples and embodiments of employing the solution as described herein, where appropriate. The vehicle manager 600 is shown to comprise a processor "P", a memory "M" and a communication circuit "C" with suitable equipment for transmitting and receiving information and data in the manner described herein.

The communication circuit C in the vehicle manager 600 thus comprises equipment configured for communication, such as data from radio access points in a wireless network, using suitable protocols and messages, using a suitable protocol for the communication depending on the implementation. The solution is however not limited to any specific types of messages or protocols used for any of the communications mentioned herein.

The vehicle manager 600 is, e.g. by means of units, modules or the like, configured or arranged to logically perform the actions of the flow chart in FIG. 1B and at least some of the actions of the flow chart in FIG. 4, as follows.

The vehicle manager 600 is arranged to manage a remote-controlled vehicle 160. The vehicle manager 600 is configured to obtain an original route to the destination wherein said original route passes a sequence of radio access points in a wireless network that a wireless device in the vehicle 160 will connect to in a communication with the vehicle manager 600 when the vehicle 160 travels along the original route. This operation may be performed by an obtaining module 600A in the vehicle manager 600, as also illustrated in action 100. The obtaining module 600A could alternatively be named a receiving module or a model acquiring module.

The vehicle manager 600 is also configured to detect at least one deficient radio access point of the original route that will provide a connection not fulfilling requirements of said communication. This operation may be performed by a detecting module 600B in the vehicle manager 600, as also illustrated in action 102. The detecting module 600B could alternatively be named a logic module or a model configuring module.

The vehicle manager 600 is further configured to instruct the vehicle 160 to adapt its behaviour based on said detecting. This operation may be performed by an instructing module 600C in the vehicle manager 600, as also illustrated in action 104. The instructing module 600C could alternatively be named an initiating module.

The vehicle manager 600 is further configured to determine an alternative route to the destination not passing the at least one deficient radio access point, and wherein the instructing comprises directing the vehicle 160 to travel along said alternative route. This operation may be performed by a determining module 600D in the vehicle manager 600, as also illustrated in action 106. The determining module 600D could alternatively be named a defining module.

It should be noted that FIG. 6 illustrates various functional modules in the vehicle manager 600 and the skilled person is able to implement these functional modules in practice using suitable software and hardware equipment. Thus, the solution is generally not limited to the shown structure of the vehicle manager 600, and the functional modules therein may be configured to operate according to any of the features, examples and embodiments described in this disclosure, where appropriate.

The functional modules 600A-D described above may be implemented in the vehicle manager 600 by means of program modules of a computer program comprising code means which, when run by the processor P causes the vehicle manager 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the vehicle manager 600 in the form of a memory having a computer readable medium and being connected to the processor P. The computer program product or memory M in the vehicle manager 600 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the vehicle manager 600.

The solution described herein may be implemented in the vehicle manager 600 by a computer program comprising instructions which, when executed on at least one processor, cause the at least one processor to carry out the actions according to any of the above embodiments and examples, where appropriate. The solution may also be implemented at the vehicle manager 600 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "vehicle manager", "machine learning model", "radio base station", "radio access point", "performance model", "remote-controlled vehicle", "original route", "alternative route" and "performance history" have been used throughout this disclosure, although any other corresponding entities, functions, and/or parameters could also be used having the features and characteristics described here. The solution is defined by the appended claims.

The invention claimed is:

1. A method for managing a remote-controlled vehicle, the method comprising:
   obtaining an original route for the remote-controlled vehicle, wherein said original route passes a sequence of radio access points in a wireless network that a wireless device in the vehicle will connect to in a communication with a vehicle manager when the vehicle travels along the original route, wherein the sequence of radio access points comprises a first radio access point;
   the vehicle manager detecting at least one deficient radio access point of the original route that will not provide a connection fulfilling requirements of said communication, wherein the at least one deficient radio access point comprises the first radio access point;
   the vehicle manager determining the original route will not fulfill the requirements of said communication based on an estimated time-of-arrival of the vehicle at the first radio access point; and
   as a result of determining the original route will not fulfill the requirements, the vehicle manager instructing the vehicle to adapt its behavior based on said detecting and a coverage area of the at least one deficient radio access point, wherein
   the vehicle manager is remote from the vehicle, and
   instructing the vehicle to adapt its behavior based on said detecting comprises the vehicle manager transmitting, via the wireless network, an instruction message to the wireless device in the vehicle.

2. The method according to claim 1, wherein the method further comprises:
   determining an alternative route to the destination not passing the at least one deficient radio access point, and wherein the instructing comprises directing the vehicle to travel along said alternative route.

3. The method according to claim 2, wherein at least one of the detecting and determining is performed based on performance history of said radio access points.

4. The method according to claim 3, wherein at least one of the detecting and determining is performed using a machine-learning model that is trained based on said performance history.

5. The method according to claim 2, wherein the determining is based on a shortest path algorithm.

6. The method according to claim 1, wherein the adapting the vehicle's behavior comprises at least one of: wait, return vehicle to home, park at a nearby place, revert to autonomous mode, send diagnostics data to the vehicle manager and run with limited speed.

7. The method according to claim 1, wherein the detecting comprises determining a forecast of when the first radio access point will not fulfil said requirements of the communication.

8. The method according to claim 1, wherein the detecting comprises determining that the at least one deficient radio access point violates a service level agreement since a predicted performance indicator of said deficient radio access point(s) does not fulfil a threshold condition.

9. The method according to claim 1, wherein the performance history comprises one or more of: radio access point metrics, performance metrics related to the communication between driver and remote-controlled vehicle, network metrics and parameters related to a cloud edge.

10. The method according to claim 1, wherein the method further comprises:
    determining said original route as a trajectory T of the remote-controlled vehicle for a service task, wherein the trajectory T includes a list of radio access points, and wherein the trajectory T is based on machine learning, and wherein the trajectory T is estimated based on previous trajectories for the specific vehicle and task, and wherein the trajectory T includes an estimated time-of-arrival at each radio access point,
    calculating a service performance Y of each radio access point in the trajectory T based on machine learning,
    predicting that the service performance Y of at least one radio access point is violating a service level agreement, and
    determining the alternative route as a new trajectory that traverses radio access points where the service is expected to fulfil the service level agreement.

11. A computer program product comprising a non-transitory computer readable medium storing a computer program comprising instructions which, when executed on at least one processor, cause the at least one processor to carry out the method according to claim 1.

12. A method for managing a remote-controlled vehicle, the method comprising:
    obtaining an original route for the remote-controlled vehicle, wherein said original route passes a sequence of radio access points in a wireless network that a wireless device in the vehicle will connect to in a communication with a vehicle manager when the vehicle travels along the original route, wherein obtaining the original route comprises determining the original route based on a service task and a previous route for the service task;
    the vehicle manager detecting at least one deficient radio access point of the original route that will provide a connection not fulfilling requirements of said communication; and
    in response to detecting the at least one deficient radio access point, the vehicle manager instructing the vehicle to adapt its behavior based on said detecting and a coverage area of the at least one deficient radio access point, wherein
    the vehicle manager is remote from the vehicle, and
    instructing the vehicle to adapt its behavior based on said detecting comprises the vehicle manager transmitting, via the wireless network, an instruction message to the wireless device in the vehicle.

13. The method according to claim 1, wherein the original route comprises access point information identifying the first access point and a second access point.

14. The method of claim 1, wherein
the sequence of radio access points comprises a second radio access point, and
the method further comprises the vehicle manager determining an estimated time-of-arrive of the vehicle at the first radio access point and the second radio access point.

15. The method according to claim 1, wherein
the original route further comprises time-of-arrival (ToA) information indicating i) a time at which the vehicle is expected to arrive at the first access point and ii) a time at which the vehicle is expected to arrive at a second access point.

16. A vehicle manager arranged to manage a remote-controlled vehicle, wherein the vehicle manager is configured to:
obtain an original route for the remote-controlled vehicle wherein said original route passes a sequence of radio access points in a wireless network that a wireless device in the vehicle will connect to in a communication with the vehicle manager when the vehicle travels along the original route, wherein the sequence of radio access points comprises a first radio access point;
detect at least one deficient radio access point of the original route that will not provide a connection fulfilling requirements of said communication, wherein the at least one deficient radio access point comprises the first radio access point;
determine the original route will not fulfill the requirements of said communication based on an estimated time-of-arrival of the vehicle at the first radio access point; and
as a result of determining the original route will not fulfill the requirements, instruct the vehicle to adapt its behavior based on said detecting and a coverage area of the at least one deficient radio access point, wherein the vehicle manager is remote from the vehicle, and
instructing the vehicle to adapt its behavior based on said detecting comprises transmitting, via the wireless network, an instruction message to the wireless device in the vehicle.

17. The vehicle manager according to claim 16, further being configured to:
determine an alternative route to the destination not passing the at least one deficient radio access point, and
wherein the instructing comprises directing the vehicle to travel along said alternative route.

18. The vehicle manager according to claim 17, wherein the vehicle manager is adapted to determine the alternative route to the destination based on performance history of said radio access points.

19. The vehicle manager according to claim 16, wherein the adapting the vehicle's behavior comprises at least one of: wait, return vehicle to home, park at a nearby place, revert to autonomous mode, send diagnostics data to the vehicle manager and run with limited speed.

20. The vehicle manager according to claim 16, wherein the vehicle manager is adapted to detect the at least one deficient radio access point based on performance history of said radio access points.

21. The vehicle manager according to claim 16, wherein the vehicle manager is adapted to detect the at least one deficient radio access point by determining a forecast of when the at least one deficient radio access point will not fulfil said requirements of the communication.

22. The vehicle manager according to claim 16, wherein the vehicle manager is adapted to detect the at least one deficient radio access point by determining that the at least one deficient radio access point violates a service level agreement since a predicted performance indicator of said deficient radio access point(s) does not fulfil a threshold condition.

23. The vehicle manager according to claim 16, wherein the performance history comprises one or more of: radio access point metrics, performance metrics related to the communication between driver and remote-controlled vehicle, network metrics and parameters related to a cloud edge.

24. The vehicle manager according to claim 16, further being configured to:
determine said original route as a trajectory T of the remote-controlled vehicle for a service task, wherein the trajectory T includes a list of radio access points, and wherein the trajectory T is based on machine learning, and wherein the trajectory T is estimated based on previous trajectories for the specific vehicle and task, and wherein the trajectory T includes an estimated time-of-arrival at each radio access point,
calculate a service performance Y of each radio access point in the trajectory T based on machine learning,
predict that the service performance Y of at least one radio access point is violating a service level agreement, and
determine the alternative route as a new trajectory that traverses radio access points where the service is expected to fulfil the service level agreement.

* * * * *